United States Patent [19]
Kane

[11] 3,939,025
[45] Feb. 17, 1976

[54] METHOD OF MAKING A POLYETHYLENE TEREPHTHALATE LAMINATE

[75] Inventor: William Paul Kane, Bon Air, Va.

[73] Assignee: E. I. DuPont de Nemours & Co., Wilmington, Del.

[22] Filed: Apr. 2, 1974

[21] Appl. No.: 457,382

Related U.S. Application Data

[62] Division of Ser. No. 281,943, Aug. 18, 1972, Pat. No. 3,924,013.

[52] U.S. Cl. .............. 156/244; 156/322; 428/481
[51] Int. Cl.$^2$ ........................................... B29F 3/00
[58] Field of Search .......... 156/244, 322, 499, 500; 161/232; 264/176 R

[56] References Cited
UNITED STATES PATENTS

| | | | |
|---|---|---|---|
| 3,238,284 | 3/1966 | Sutton | 156/244 |
| 3,372,148 | 3/1968 | Wiener | 156/332 |
| 3,382,295 | 5/1968 | Taylor et al. | 156/322 |
| 3,498,865 | 3/1970 | Paquin et al. | 156/244 |
| 3,515,626 | 6/1970 | Duffield | 156/244 |

Primary Examiner—Caleb Weston

[57] ABSTRACT

A container is provided formed from a blank made of a laminate which includes nonbrowning paperboard and at least an inner layer of substantially amorphous polyethylene terephthalate bonded to the paperboard by its own substance. A method of making this laminate is provided including the steps of heating an uncoated surface or both surfaces of the paperboard to a temperature of at least about 285°F. and extruding the polyethylene terephthalate layer onto this surface or these surfaces. A method of cooking is provided including the steps of forming a container from the blank, placing food in the container and cooking the food at a temperature of up to about 400°F.

3 Claims, 6 Drawing Figures

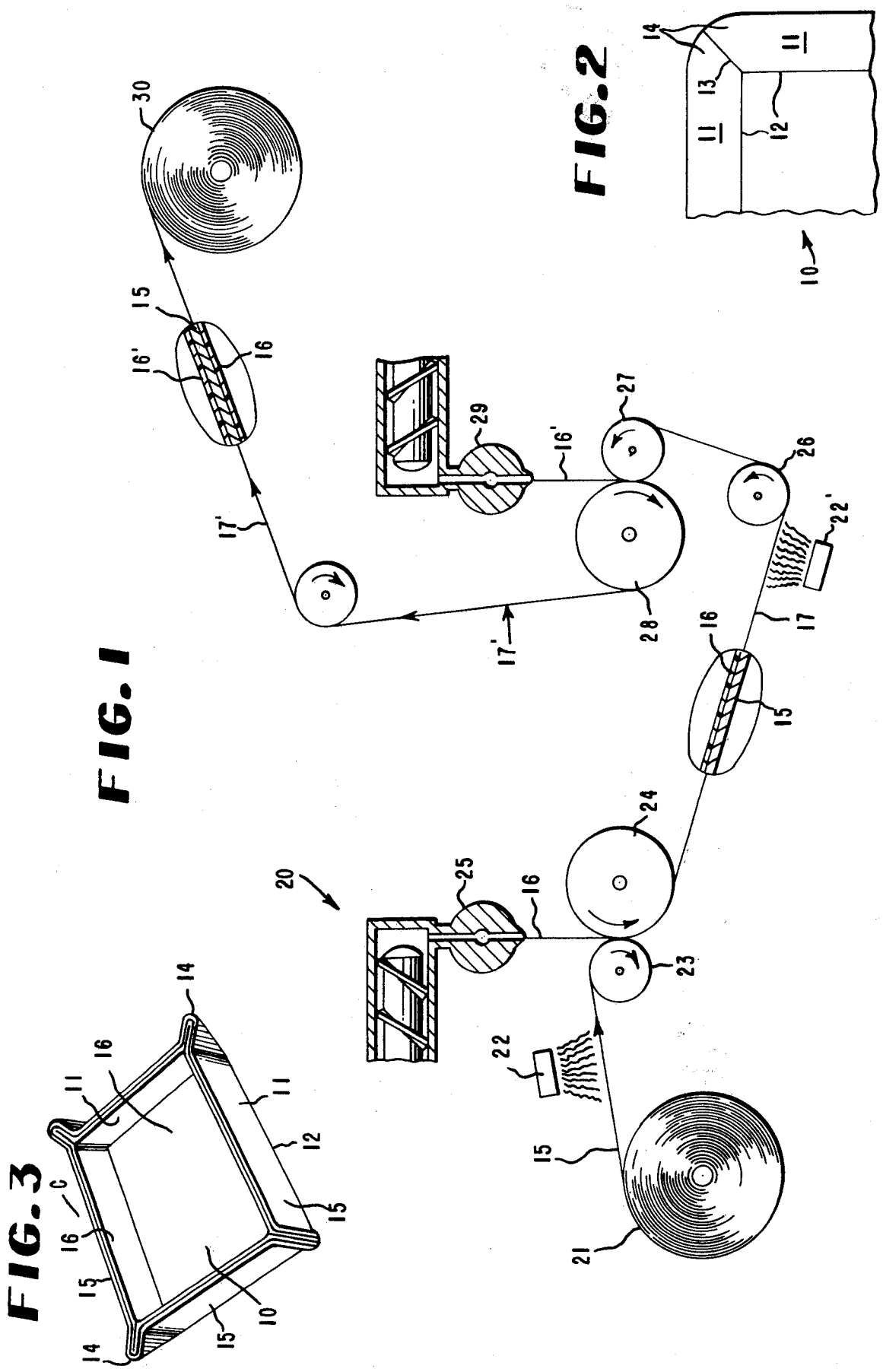

METHOD OF MAKING A POLYETHYLENE TEREPHTHALATE LAMINATE

This is a division of application Ser. No. 281,943, filed Aug. 18, 1972, U.S. Pat. No. 3,924,013.

BACKGROUND OF THE INVENTION

1. Field of the Invention

This invention is a cooking method using a novel container formed from a blank of a novel material (i.e., a laminate of at least a layer of polyethylene terephthalate and nonbrowning paperboard). This invention is also a method of making this novel laminate including the step of heating, at critical temperatures, an uncoated surface of surfaces of the paperboard to improve adhesion between it and the polyethylene terephthalate material extruded thereon.

2. Description of the Prior Art

The following prior art is of interest to the laminate and its method of manufacture of this invention:

U.S. Pat. No. 3,402,086 to Smith et al. shows a process for hot-melt extrusion coating of paperboard or paper with a randon copolymer of ethylene containing α,β-ethylenically unsaturated monocarboxylic acid wherein the paper is preheated by hot rolls to a temperature within the range of 80°C. to 250°C. prior to being melt coated.

U.S. Pat. No. 3,498,865 to Psquin et al. shows a continuous process for coating paper with a film of extrudable plastic, such as polyethylene, wherein the air in the region of convergence of paper and plastic film is ionized. The specification discloses that the paper which contacts the molten polyethylene is heated by use of steam-heated rolls to a temperature of 65°C. to 115°C. Infrared or other heating elements may also be used for heating the paper.

Canadian Pat. No. 529,361 to Fields shows a process for extrusion coating a synthetic linear polymer having a sharp melting point onto a sheet. Polyesters are disclosed as useable materials for the coating and paper is included as a material that can be used for the sheet.

Canadian Pat. No. 781,424 to Marshall discloses a method of coating a porous web with a continuous film of a thermoplastic polymer wherein the porous web is preheated before the application of the molten film of the polymeric material. Porous paper may be used as the porous web material and polyesters may be used for coating the porous webs.

British Pat. No. 1,119,804 to Rohm & Haas Company discloses a laminate comprising a substrate such as a sheet of paper and a layer of polyhexamethylene terephthalate which has been melt-extruded thereon.

A prior art patent of interest to the container and cooking method of this invention is U.S. Pat. No. 3,276,900 to Funck, which shows the use of a paperboard component in a container used in cooking foods at relatively high temperatures.

Another patent of interest in the food container art is U.S. Pat. No. 3,316,102 to Doll et al. which shows a food tray blank, container and package, and which blank includes means for locking parts of the container together to hold it in erected position without use of adhesives or mechanical fasteners.

U.S. Pat. No. 3,550,835 to Persson is also exemplary of the container and cooking arts. Such patent teaches a package especially for food products, which package is a tray erected from a paperboard blank which has at least on one side a fluidtight plastic coating, i.e., polypropylene, which is adapted to be sealed and withstands heating to about 305°F. While this package is suitable for relatively low cooking temperature use, it cannot withstand heating at the high temperatures above 325°F. and to about 400°F., which temperatures are those most commonly used in the precooked, convenience food areas of cooking.

SUMMARY OF THE INVENTION

According to the present invention, a container is provided for use, preferably, in the packaging of food and for use in the subsequent cooking or reheating of the food in preparation for human consumption. The container is formed from a blank made of a material comprising nonbrowning paperboard with polyethylene terephthalate material extruded onto one or both of its surfaces. The method of making such material in which an uncoated surface or surfaces of the paperboard is heated, preferably by flame, enables a bond to be set up between the paperboard and polyethylene terephthalate that is effective in use applications of this sort. In forming the container from the blank of this invention, the polyethylene terephthalate surface, or parts of it, may be brought into abutting contact with other parts of the polyethylene terephthalate surface or with parts of the paperboard surface and secured or heat-sealed together, or the container may be formed by appropriately folding the blank or by heating the blank and die pressing it into container form. Food is then placed in the container, which food may then be reheated or heated to temperatures up to about 400°F. without having browning problems with the paperboard and without having delamination problems with the laminate.

This container does not deleteriously effect the cooking of the food contained therein and may be formed at low heatsealing temperatures and cooked or used at high cooking temperatures and still remain attractive in appearance.

Cooking containers are well known to the art. Many types of materials are used to frabricate these containers. Such materials can generally be characterized into one of three primary types or combinations of them. These types are paperboard, aluminum and certain thermoplastic materials. There are advantages and disadvantages resulting from the use of each of these types of materials in fabricating food containers. For example, the nonpaperboard containers are generally nonbiodegradable and the aluminum containers are difficult to hermetically seal and cannot be used in microwave ovens; paperboard containers, on the other hand, do not have these disadvantages.

Despite the widespread use of paperboard in the packaging industry, however, certain limitations in its utility have long been recognized. For example, uncoated paperboard packages are weakened by moisture and are not impervious to greases and oils and char and brown at high cooking temperatures. Further, this paperboard browning is still an important, unsolved, problem factor even when the paperboard is coated with certain plastic materials; i.e., polypropylene coated paperboard "browns" when heated to temperatures of about 305°F. Consequently, when packaging certain types of foods for cooking, paperboard may lack a key property relating to the appearance of the package. Other physical characteristics of paperboard have limited the forms of the package and the types of surface treatment which could be used on paperboard packaging materials.

Convenience foods, for example, may be precooked and packaged in certain containers and then reheated. For this reason they must be capable of withstanding this subsequent food-heating operation without causing adverse effects with the food or the package. The containers used for this should be capable of being subjected to temperatures of up to 400°F. Prior to this invention, known paperboard containers could not be so employed primarily because such containers easily char when subjected to temperatures of this order and the browning destroys the aesthetics of the container.

The instant invention provides novel containers formed from a blank made in part of paperboard which exhibits unique packaging versatility and which overcomes disadvantages, such as browning at high temperatures, of currently used container materials. In its broadest terms, this invention is a disposable container which comprises a layer of nonbrowning paperboard and at least a layer of substantially amorphous polyethylene terephthalate bonded to the paperboard layer by its own substance. This includes, for example, containers formed from blanks by folding, die-pressed containers and the like.

Specifically, the instant invention in one embodiment provides a container for baking and cooking which comprises:

a substantially flat bottom part;

at least four upstanding sides hingedly connected to the flat bottom;

corners joining adjacent upstanding sides hingedly connected to the flat bottom parts;

the container being formed of a 2-ply laminate comprising a layer of nonbrowning paperboard and at least a layer of substantially amorphous polyethylene terephthalate bonded to the paperboard layer by its own substance; and the corners being formed by heat-sealing surface portions of the substantially amorphous polyethylene terephthalate layer of adjacent sides together and the polyethylene terephthalate in the corners being partially crystalline, thereafter.

In another embodiment, this invention is a container for baking and cooking which comprises:

a substantially flat bottom part and body parts connected thereto;

the container being formed of a laminate comprising a layer of nonbrowning paperboard and at least a layer of substantially amorphous polyethylene terephthalate bonded to the paperboard layer by its own substance; and the container having abutting surface portions of the body parts secured together.

In this container at least one and, if desired, both, of each of the abutting surface portions of the body parts is of the polyethylene terephthalate layer and such abutting surface portions may be heat-sealed together or secured together by other means, such as staples or adhesives, or by interlocking parts, for example.

All of these containers may be formed from a container blank of this invention having parts including a bottom part with body parts connected thereto, such blank being formed of a laminate including a nonbrowning paperboard having a least an extruded layer of polyethylene terephthalate bonded thereto.

A method of forming a container from this blank includes the steps of: folding the blank whereby surface portions of body parts are brought into abutting contact with each other, all of such surface portions being of polyethylene terephthalate; and heat-sealing such abutting surface portions together to form a container. Such abutting surface portions are heat-sealed together at a temperature of at least about 320°F.

Another method of forming a container from the blank includes the steps of: folding the blank whereby surface portions of the body parts are brought into abutting contact with each other; and securing such abutting surface portions together to form a container. Such abutting surface portions may be heat-sealed together at a temperature of at leasst about 320°F. or secured together by other means. At least one of each of such abutting surface portions is of the polyethylene terephthalate layer and the other of each of such abutting surface portions may be of the nonbrowning paperboard.

Still another method of forming a container from the blank includes the steps of: heating the blank to a temperature of at least 320°F., and pressing the blank to form a container.

And, further, a method of this invention is provided of making a laminate suitable for use in making these blanks and containers comprising the steps of which include: passing a nonbrowning paperboard web having a pH of between 7.0 and 7.5 adjacent a heating source; heating an uncoated first surface of the paperboard to a temperature of at least about 285°F. by means of the heating source; extruding a layer of polyethylene terephthalate onto the uncoated first surface of the heated paperboard, such polyethylene terephthalate having an intrinsic viscosity within the range of 0.51 to 0.85; and cooling the extruded layer of polyethylene terephthalate to solidity it and to effect a bond between the paperboard and the polyethylene terephthalate to form a 2-ply laminate.

A method of this invention further is provided of making a 3-ply laminate suitable for these same uses wherein the other surface of the paperboard of the 2-ply laminate also is uncoated and wherein the paperboard is heated to a temperature of from about 285°F. to about 340°F. including the additional steps of: extruding a layer of polyethylene terephthalate onto such uncoated second surface of the heated paperboard, such polyethylene terephthalate having an intrinsic viscosity within the range of 0.51 to 0.85; and cooling this extruded layer of polyethylene terephthalate to solidify it and to effect a bond between it and the paperboard to form the 3-ply laminate.

And, lastly, a method is provided for cooking in these novel containers formed from blanks made of these novel 2-ply and 3-ply laminates, which cooking method includes the steps of: forming a container from a blank formed from a 2-ply laminate consisting of a nonbrowning paperboard layer having a layer of polyethylene terephthalate extruded thereon and bonded thereto by its own substance by the methods previously described; placing food in the container; and, cooking the food at a temperature of up to about 400°F.

BRIEF DESCRIPTION OF THE DRAWING

FIG. 1 is a diagrammatic view of apparatus suitable for making a 2-ply and 3-ply laminate of this invention;

FIG. 2 is a fragmentary plan view of a corner blank made from a laminate of this invention (with parts omitted for clarity); and FIG. 3 is a perspective view showing a container formed from the blank of FIG. 2.

DESCRIPTION OF THE PREFERRED EMBODIMENTS

Figure 4:
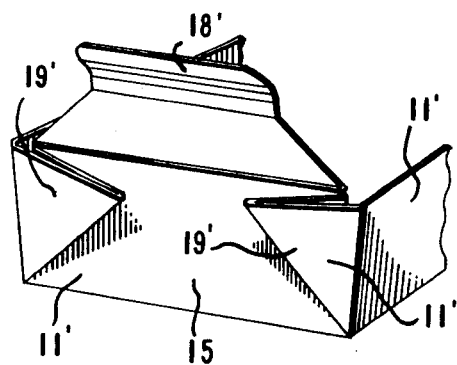
FIGS. 4 and 5 are perspective views of another container of this invention, showing a locking tab body part before and after it is tucked into position to embrace and retain folded side extension body parts in place.

Referring to the drawings, and in particular FIG. 3, there is shown a typical novel container C of this invention.

Such container C is formed from a blank B, of the type shown in FIG. 2, which blank is suitably cut and scored to define parts including a bottom part 10 with body parts or sides 11 hingedly connected thereto along fold or score lines 12. Other fold lines, such as those designated 13, extend from the fold lines 12 and define means for enabling the blank to be folded at the corners 14 thereof in forming the container C, in a manner to be described.

In forming the container C from the blank B the sides 11 are folded upwardly with respect to the bottom part 10 and corner portions 14' of the inner surface of adjacent sides 11 are brought into abutting contact with each other and secured (i.e., heat-sealed) together to form the corners 14 of the container C from the corner portions 14. The material of the inner surface of the blank B is such that it is heat-sealable to itself or to paperboard layer 15 as will be further explained.

The blank B is made from a novel laminate of this invention consisting of a layer of nonbrowning paperboard 15, such as so-called "14 point board", having a layer of polyethylene terephthalate 16 extruded onto an uncoated first surface or such paperboard 15 in a novel manner and bonded to such paperboard by its own substance to form a 2-ply laminate 17, as best shown in FIGS. 1 and 3. If desired, another layer of polyethylene terephthalate 16' may be extruded onto the other uncoated second surface in accordance with this invention to form a 3-ply laminate 17'.

Figure 5:
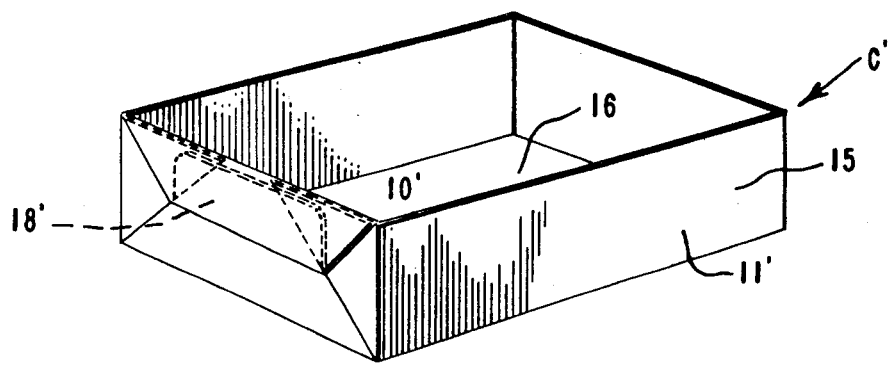
Figure 6:
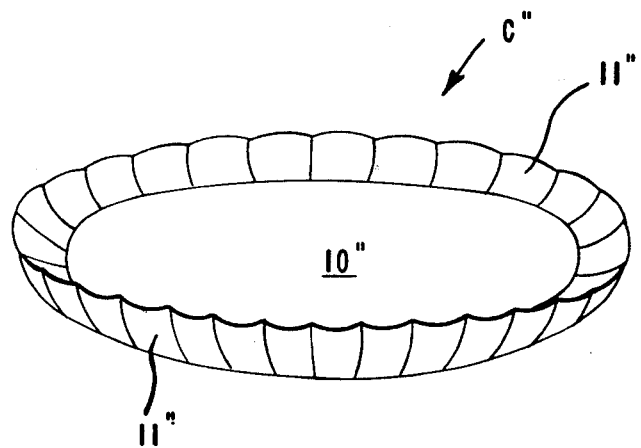
FIG. 6 is a perspective view showing still another container of this invention (i.e., a cooking plate) which may be formed by die pressing a suitable blank made from a laminate also of this invention.

Other typical containers C' and C'' formed from the 2-ply and 3-ply laminates 17 and 17' of the invention are shown in FIGS. 4-6.

The container C' is formed from a suitably cut and scored blank, as shown, for example, in U.S. Pat. No. 2,373,730, which blank includes a bottom part 10' and body parts 11' connected thereto by folding the blank whereby surface portions of the body parts 11' are brought into contact with each other and secured together (i.e., heat-sealed or interlocked, etc.) to form the container. In other words, in forming the container C', the locking tab body part 18' is tucked into the position shown in FIG. 5 to embrace and retain the folded side extension body parts 19' in place, which tucking secures the surface portions of the body parts together.

It is noted that in this position surface portions of the body parts are brought into abutting contact with each other with parts of the polyethylene terephthalate layer 16 surface in contact with parts of the paperboard layer 15 surface. While the tucking of the tab 18' into position above will secure the surface parts together, if desired, the parts may also or only be heat-sealed together to do the same. This invention, then, includes the heat-sealing of surface portions of the polyethylene terephthalate layer to other portions of that layer as well as to the paperboard layer and further includes the interlocking of these parts together, in forming a container of this invention.

The container C'', as shown in FIG. 6, is still another example of a container formed using a laminate 17 or 17' of this invention, which container (i.e., a cooking plate) may be formed from a suitably shaped blank by heating the blank to at least 320°F., and by pressing the heated blank to form a bottom 10'' with body portion 11'' conncted thereto.

The specific type of paperboard 15 used in forming a laminate of this invention is critical. Among its most important characteristics is that the surface of such paperboard to which the polyethylene terephthalate layer is to be fused preferably is uncoated and, if coated at all, should not be clay coated. It has been found that unless this is so the adhesion properties are less than those desired.

Other properties of the paperboard which are required when it is combined with a polyethylene terephthalate layer for use in cooking at high temperatures include the property of nonbrowning. It has been found to be critical that the pH must be controlled between 7.0 and 7.5 to provide a paperboard that does not brown at cooking temperatures of up to about 400°F.

As to nonbrowning, it has been found that the surface of the paperboard opposite that to which the polyethylene terephthalate layer is adhered may be coated with a clay coating, if desired, and that it is still possible to obtain excellent adhesion to the noncoated side of this paperboard.

The polyethylene terephthalate material of this invention is formed from a polymer formed by the condensation reaction of ethyl glycol and terephthalic acid. Particulars of this material are shown and described in U.S. Pat. No. 2,465,319 to Whinfield and Dickson. More specifically, polyethylene terephthalate useful in preparing the laminate of this invention includes (a) polymers wherein at least about 97% of the polymer contains the repeating ethylene terephthalate units of the formula:

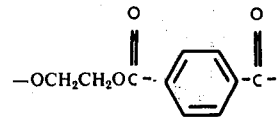

with the remainder being minor amounts of ester-forming components, and (b) copolymers of ethylene terephthalate wherein up to about 10 mole percent of the copolymer is prepared from the monomer units of diethylene glycol; propane-1,3-diol; butane-1,4-diol; polytetramethylene glycol; polyethylene glycol; polypropylene glycol; 1,4-hydroxymethylcyclohexane and the like, substituted for the glycol moiety in the preparation of the copolymer and/or isophthalic; bibenzoic; naphthalene 1,4- or 2,6-dicarboxylic adipic; sebacic; decane-1,10-dicarboxylic acid, and the like, substituted for the acid moiety in the preparation of the copolymer.

Preferably, the intrinsic viscosity of the polymeric material of this invention is between 0.51 to 0.85. Materials of this viscosity in flake form may be obtained as start-up materials in the form of cut strands or bead trim or pelletized material or even pelletized flake. All of these flakes are subsequently dried for a period of 2 hours at 80°C. with 29-inch water under vacuum. It has been found that bulk densities of 28–40 lbs./ft.$^3$ handle well in single screw extrusion equipment.

The expression "intrinsic viscosity" is used herein as a measure of the degree of polymerization of the polyester and is defined as:

$$\left[ \frac{\ln \mu r}{C} \right]_{C \to 0}$$

wherein $\mu r$ is the viscosity of a dilute solution of the polyester in a mixture of 1 part trifluoroacetic acid and 3 parts methylene chloride, by volume, divided by the viscosity of the trifluoroacetic acid/methylene chloride mixture per se measured in the same units at 25°C. and C is the concentration in grams of the polyester per 100 cc. of solution. Intrinsic viscosity is independent of concentration by virtue of the extrapolation to $C = 0$.

Polyethylene terephthalate has an unusual number of properties which enable it to serve a diverse range of applications. These balanced properties enable it to be particularly usable as a packaging material for food. As an example, polyethylene terephthalate does not get brittle with age, it has a long shelf life; it provides a permanent, nonyellowing, dimensionally stable base and has excellent resistance to grease, oxygen and moisture. Further, it is resistant to initial tear and scratching and can withstand heavy impact and prolonged flexing. These and other properties are of great value in packaging applications.

Preferably, the thickness of the paperboard is about 14 mils and the thickness of the polyethylene terephthalate layer is 1 mil or thereabouts.

In the practice of this invention, it has been found necessary to heat an uncoated first surface of the paperboard to a temperature of at least 285°F. before the molten polyethylene terephthalate material is extruded onto the paperboard. If the second surface of the paperboard is coated, a maximum temperature of 340°F. has been found possible. At temperatures in excess of this when coating or extruding polyethylene terephthalate onto this uncoated second surface of the paperboard, it has been found that blocking occurs, primarily blocking of the coating on the first surface to the extruded material or coating on the second surface occurs. Further, the coating tends to adhere to the chill roll at above this maximum.

A blank formed from the laminates, either 2-ply or 3-ply, of this invention, heat-seals easily at about 320°F. This property enables the blank to be folded, by folding the body parts along the fold lines upwardly with respect to the bottom part and the bringing of surface portions of the body parts together, such portions all being of polyethylene terephthalate or one being of paperboard and the heat-sealing of these portions together to form the container. Excellent heat seals of polyethylene terephthalate to itself, for example, may be obtained with densities of 1.3300 to 1.3360, as measured at 27°C. in a $CCl_4$/heptane solid mixture.

Typical heat-sealing temperatures that have been found workable in forming a container of this invention have included 320°F. at 3 seconds dwell and 60 psi and 355°F. at 3 seconds dwell and 60 psi, each of which produce a seal strength (fiber tearing) of greater than 3,000 grams/inch when a laminate of 14 mil-thick paperboard coated with polyethylene terephthalate is heat-sealed with abutting surface portions of the polyethylene terephthalate layer in contact with each other. When this layer is heat-sealed to an uncoated side of the paperboard at 355°F. at 6 seconds dwell and 60 psi a seal strength of about 600 grams/inch is obtained.

The containers of this invention are particularly well suited for baking or cooking foods at temperatures up to about 400°F.

A typical method of cooking includes the steps of:

forming a container from a blank formed from a laminate including the nonbrowning paperboard having at least a layer of polyethylene terephthalate extruded thereon and bonded thereto by its own substance by folding the blank to bring surface portions of the polyethylene terephthalate layer thereof into abutting contact with other surface portions of such layer and by heat-sealing these abutting surface portions together;

placing food in the container; and cooking the food at a temperature of up to about 400°F.

Another method of cooking includes the steps of:

forming a container from a blank formed of a laminate including the nonbrowning paperboard having at least a layer of polyethylene terephthalate extruded thereon and bonded thereto by its own substance by folding the blank to bring surface portions of the polyethylene terephthalate layer thereof into abutting contact with surface portions of the paperboard layer and by heat-sealing these abutting surface portions together;

placing food in the container; and cooking the food at a temperature of up to about 400°F.

Still another method of cooking includes the steps of:

forming a container from a blank formed from a laminate including the nonbrowning paperboard having at least a layer of polyethylene terephthalate extruded thereon and bonded thereto by its own substance; placing food in the container; and cooking the food at a temperature of up to about 400°F. This container may be formed by heating the blank to at least 320°F. and by pressing the heated blank or by folding the blank.

Lastly, another method of cooking includes the steps of:

forming a container from a blank formed from a laminate consisting of the nonbrowning paperboard having at least a layer of polyethylene terephthalate extruded thereon and bonded thereto by its own substance by folding the blank to bring surface portions of body parts thereof into abutting contact with each other and by securing these abutting surface portions together; placing food in the container; and cooking the food at a temperature of up to about 400°F.

In all of these cooking methods, the novel laminates of this invention enable the cooking to be done under workable conditions and at unusually high temperatures, without paperboard browning problems, for example.

METHODS OF AND APPARATUS FOR MAKING THE LAMINATE

A preferred method of making the laminate of this invention includes the step of extruding molten polyethylene terephthalate material onto an uncoated surface of paperboard material after such paperboard material has been flameheated to a temperature of at least 285°F.

Referring to FIG. 1, there is shown a schematic representation of an apparatus for making the material of this invention. Such material, whether 2-ply laminate 17 or a 3-ply laminate 17' is formed under novel and critical conditions.

In making such material, the paperboard 15, in the form of a web, for example, is supplied from a supply roll 21 and is moved by appropriate means, not shown, past a heating means or source, such as flame or hot gas, 22 and into a nip formed by contacting rotating surfaces of a nip roll 23 and a quench or chill roll 24 where the paperboard is combined with a layer of the freshly extruded molten polyethylene terephthalate material 16 to form the 2-ply laminate 17.

The molten material 16 is extruded onto the uncoated surface of the paperboard 15 from an extrusion die 25. This molten material 16 descends through an air gap until it contacts the first surface of the paperboard 16 in the nip area. The paperboard and polyethylene terephthalate layers are firmly pressed together between the elastomeric covered roll 23 and the chill roll 24 so that the molten polyethylene terephthalate layer 16 is joined to or fused to the paperboard 15 by its own substance.

It is important that the pressure and heat applied are sufficient to combine or fuse the paperboard and polyethylene terephthalate layer together and it is critical that the first uncoated surface of the paperboard be heated to a temperature of at least 285°F. prior to the extrusion of the polyethylene terephthalate layer onto such surface.

The laminate 17 is then passed by a second heating means 22', around an idler roll 26 and a nip roll 27 and into a nip formed by coacting surfaces of the nip roll 27 and a quench roll 28. A second molten polyethylene terephthalate layer 16' is cast into the nip from an extrusion die 29 and onto the uncoated second surface of the heated paperboard 15 which is coated with the molten materials 16'. The extruded molten polyethylene terephthalate layer 16' like the layer 16 previously applied sets up strongly and is fused to the paperboard member by its own substance to form the 3-ply laminate 17'.

After formation of the 3-ply laminate 17', it is moved onto a windup 30 for further processing or use.

The second surface of the paperboard 15 is heated by the heating means to a critical temperature of from at least 285°F. to about 340°F. Lower temperatures than this negate desired bonding and higher temperatures than this tend to cause adherence of the coating to chill roll, for example.

Specifically, the preferred method of making the 2-ply laminate 17 of this invention includes the steps of:

passing the nonbrowning paperboard web 15 having an uncoated surface and a pH of between 7.0 and 7.5 adjacent to a flame type heating means 22;

heating the uncoated first surface of the paperboard to a temperature of from at least about 285°F. to about 340°F. by use of the flame;

extruding the layer of polyethylene terephthalate 16 onto the uncoated surface of the heated paperboard 15, such polyethylene terephthalate having an intrinsic viscosity within the range of 0.51 to 0.85; and cooling the extruded layer of polyethylene terephthalate to solidify it and to effect a bond between the paperboard 15 and the polyethylene terephthalate 16 to form the 2-ply laminate 17.

And, in making the 3-ply laminate of this invention wherein the second surface of the paperboard also is uncoated and wherein the paperboard is heated to a temperature of from about 285°F. to about 340°F., such method includes the additional steps of:

extruding the layer of polyethylene terephthalate 16' onto such other uncoated surface of the heated paperboard 15, such polyethylene terephthalate having an intrinsic viscosity within the range of 0.51 to 0.85; and cooling this extruded layer of polyethylene terephthalate to solidify it and to effect a bond between it and the paperboard to form the 3-ply laminate 17'.

The preferred method of heating the paperboard surfaces is to contiuously expose the surfaces of the moving paperboard to a flame supplied by a gaseous mixture of propane and oxygen or propane and air. The flame which emerges from a suitable burner device is composed of a primary envelope comprising the luminous, pale blue, conical inner portion which is adjacent to the burner orifice and the secondary envelope comprising the remainder of the flame. When a rectangular shaped burner orifice is employed the primary envelope is wedge-shaped in cross-section. The surface is passed through the primary envelope of the flame at a distance from the burner orifice sufficient for maintaining a self-sustaining flame. The gaseous constituents for combustion are propane and oxygen or air. The proportions of these constituents that are supplied to the burner are not critical for the successful flame heating of the paperboard surface.

The one and two-side polyethylene terephthalate coated paperboard laminates of this invention may be used to construct a variety of food containers such as trays, tray lids, roasting pans, and liquid-tight containers. The polyethylene terephthalate coating heat-seals well in addition to having excellent barrier resistant properties to grease, water, and oxygen. The heat-seal property permits one to form leak-proof liquid packages and cooking trays and the polyethylene terephthalate coating prevents the paperboard from excessive browning even at oven temperatures of up to about 400°F.

For the purpose of this invention, "container" means any plate, tray, folding carton or the like that is adapted to hold an article. It is further to be understood that all of these "containers " may be provided with a top or lid which may be heat-sealed to an appropriate part or parts of the "container" wherein the lower surface of the top is of a polyethylene terephthalate material and is bonded to an inner or upper surface or flange of the "containers" of this invention, in which the blanks from which they are formed are of a polyethylene terephthalate/paperboard laminate of this invention. Typical "containers" which may be so formed are shown in U.S. Pat. No. 3,550,835 to Persson, U.S. Pat. No. 3,257,786 to Harrison et al., and U.S. Pat. No. 3,178,017 to Bowman, for example.

I claim:

1. A method of making a laminate comprising:
   passing a non-browning paperboard having a pH of between 7.0 and 7.5 adjacent a heating source;
   heating an uncoated first surface of such paperboard to a temperature of at least about 285°F. by means of the heating source;
   extruding a layer of polyethylene terephthalate onto such uncoated first surface of the heated paperboard, such polyethylene terephthalate having an intrinsic viscosity within the range of 0.51 to 0.85; and cooling the extruded layer of polyethylene terephthalate to solidify it and to effect a bond between the paperboard and the polyethylene terephthalate to form a 2-ply laminate.

2. The method of claim 1 including the additional steps of:

passing the 2-ply laminate adjacent a heating source; heating the other uncoated second surface of such paperboard to a temperature of from about 285°F. to about 340°F. by use of the heating source;

extruding a layer of polyethylene terephthalate onto such uncoated second surface of the heated paperboard, such polyethylene terephthalate having an intrinsic viscosity within the range of 0.51 to 0.85; and cooling this extruded layer of polyethylene terephthalate to solidify it and to effect a bond between it and the paperboard to form a 3-ply laminate.

3. The method of claim 1 wherein the uncoated first surface of such paperboard is heated to a temperature of at least about 285°F. by means of a flame.

* * * * *